Figure 1:
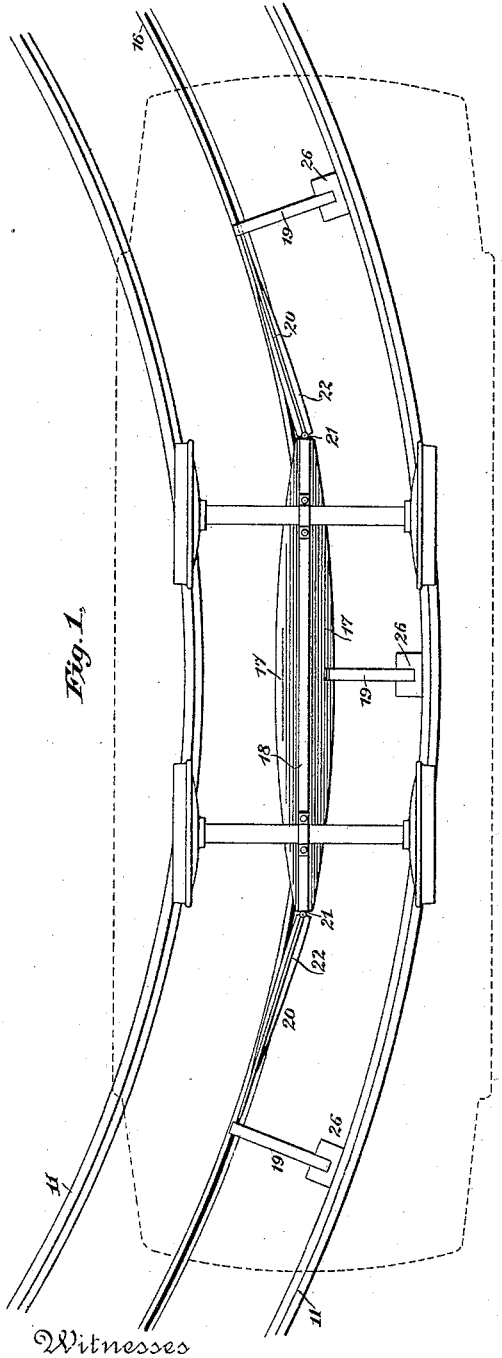

(No Model.) 2 Sheets—Sheet 1.

F. MANSFIELD.
ELECTRIC RAILWAY.

No. 432,674. Patented July 22, 1890.

Witnesses
Geo. W. Breck.
Carrie E. Ashley

Inventor
F. Mansfield,
By his Attorneys
Fowler & Fowler.

(No Model.) 2 Sheets—Sheet 2.

F. MANSFIELD.
ELECTRIC RAILWAY.

No. 432,674. Patented July 22, 1890.

Witnesses
Geo. W. Breck
Carrie E. Ashley

Inventor
F. Mansfield
By his Attorneys
Fowler & Fowler.

UNITED STATES PATENT OFFICE.

FRANK MANSFIELD, OF NEW YORK, N. Y.

ELECTRIC RAILWAY.

SPECIFICATION forming part of Letters Patent No. 432,674, dated July 22, 1890.

Application filed October 23, 1888. Renewed April 12, 1890. Serial No. 347,593. (No model.)

*To all whom it may concern:*

Be it known that I, FRANK MANSFIELD, a citizen of the United States, residing at New York, in the county of New York and State of New York, have invented certain new and useful Improvements in Electric Railways, of which the following is such a full, clear, and exact description as will enable any one skilled in the art to which it appertains to make and use the same, reference being had to the accompanying drawings, forming part of this specification.

My invention more especially relates to an underground or sub-surface electric railway in which a buried main conductor is covered throughout its length with insulating material and is provided at intervals with insulated branch conductors which are normally disconnected from the main conductor, the free contact ends of which branch conductors are movable and are made bare or provided with contact-points, so that such ends can be raised into an elevated position and placed into electrical communication with circuit-completing devices located upon a car carrying an electric motor for propelling the same.

The primary object of this class of inventions of which I am the inventor, having broadly covered the same by my applications, Serial Nos. 232,502 and 241,634, is to maintain the exposed contact ends of the branch conductors dead until they are elevated a considerable distance above the surface of the road and placed in communication with the circuit-completing devices on the car, which circuit-completing devices are in electric connection with the motor of the car. By this novel construction I obtain a minimum leakage of the current from the conductors, and, moreover, water is prevented from short-circuiting the current, since the only live exposed parts of the conductors are a considerable distance above the level of the way. It also allows the use of a current equal in voltage to that of any overhead system.

The object of the present invention is to improve some of the details of construction of the aforesaid railway; and the invention consists in a novel form of pick-up plow carried by the car for lifting a new form of branch-conductor support into electrical connection with the moving car, new and useful circuit-completing devices carried by the car, and also novel circuit-completing devices placed in the ground and actuated by the moving car, all as more fully hereinafter described, and pointed out in the claims.

Figure 2:
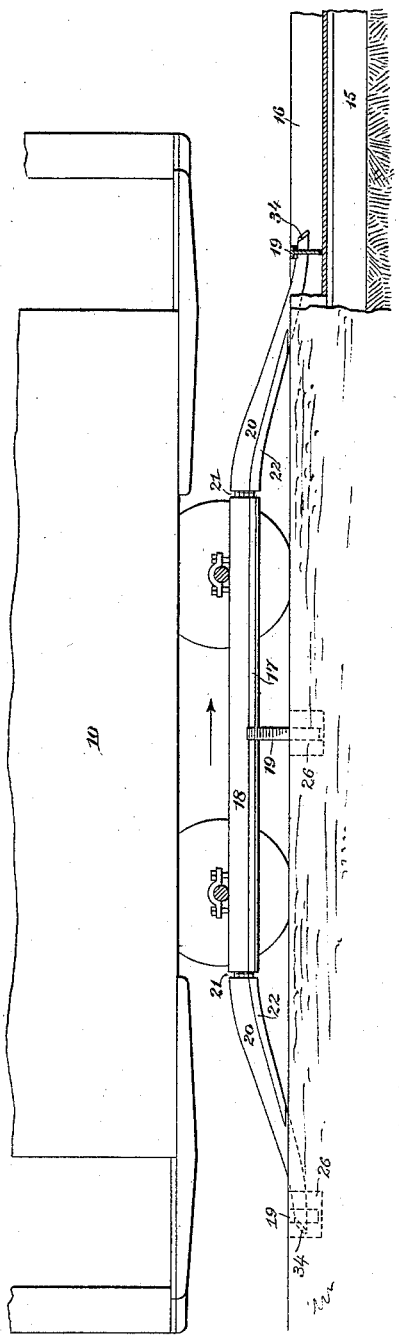
Figure 3:
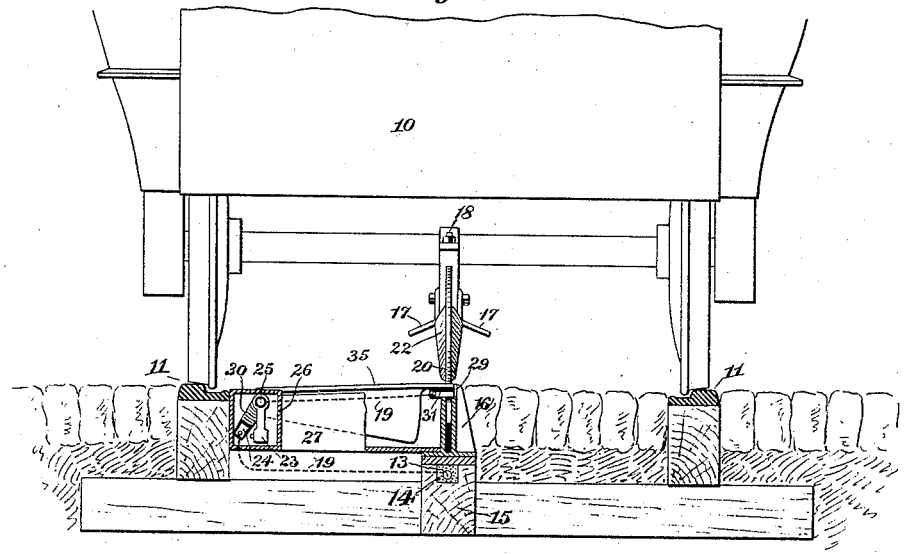
Figure 4:
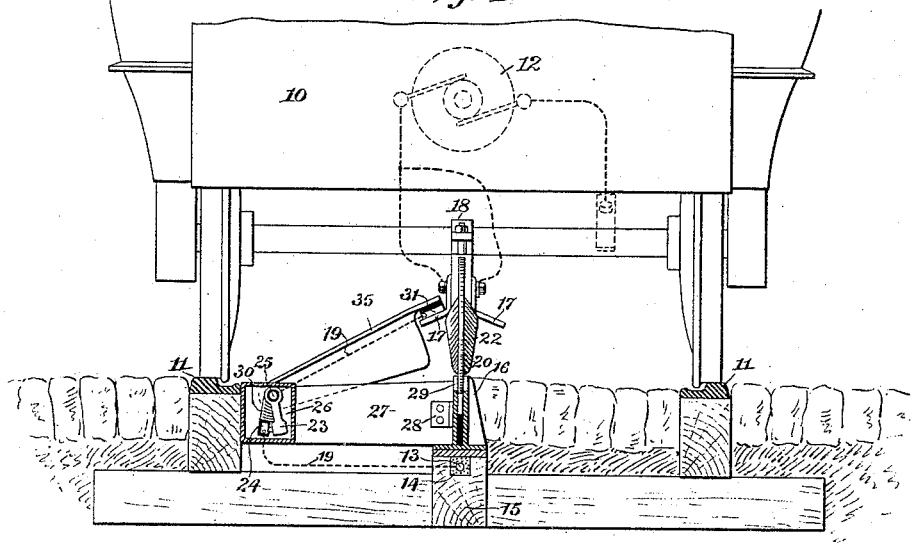
Figure 7:
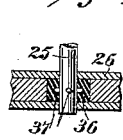
Figure 5:
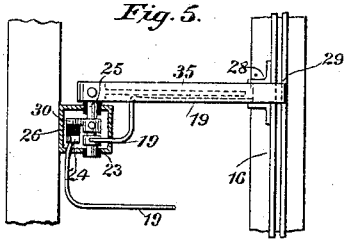
Figure 6:
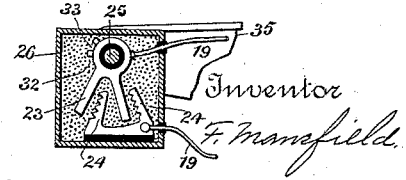

In the accompanying drawings, illustrating my invention, Figure 1 is a plan view of my improved railway with a centrally-disposed guide-slot, the car-body being indicated in broken lines. Fig. 2 is a side view of an electric car embodying my improvements, and as shown in Fig. 1. In this view the road-bed is shown partly in full and partly in section, with the interior of the slot-rail exposed to view. Fig. 3 is an end view of a car embodying my invention, the road-bed, slot-rail, and track, as well as part of the branch conductor, being shown in section. Fig. 4 is a similar view to that shown in Fig. 3, with the movable end of the branch conductor elevated into contact with the circuit-completing devices on the car, so as to admit the current to the motor carried thereby. Fig. 5 is a detached plan view of the rail-stringer and the guide-slot rail, between which is arranged the casing for the branch-conductor support and the switch-box, which latter is shown in horizontal section. Fig. 6 is a detached enlarged view of portion of a branch conductor with the switch mechanism thereof shown in section. Fig. 7 is a detached enlarged sectional view showing the manner in which the journal of the switch-shaft is set in soft rubber or elastic material to make the bearings water-tight.

In the said drawings like numbers of reference designate like and corresponding parts throughout.

Referring to the drawings, 10 designates an electric car or locomotive running on the usual track-rails 11 11 and provided with an electric motor 12 for propelling the car. In the construction shown one or both of the track-rails 11 may be used as a return-conductor for the electric current, which is supplied to the motor through branch conductors 19 19 from the main conductor 13, which is covered throughout with insulating material 14, and is buried in the central stringer 15, upon which is supported the slot-rail 16 for guiding the plow or lifter 20. If preferred, an insulated buried return may be used in conjunction with the track-rails 11, as this will afford a good return which will not be disrupted when a rail is removed. The motor 12 is in electric connection with the contact-strips 17 17, consisting of angle-pieces of metal, which are secured by their vertical flanges to the horizontal wooden plow-beam 18, (shown as swung from the car-axles,) but which may be supported in operative position in any suitable manner. The other flange of each contact-strip 17 projects laterally, so that the upper surface thereof may be conveniently placed in sliding contact with the ends of the subsidiary conductors 19, which branch from the main conductor 13 at intervals along its length and are normally disconnected therefrom. These subsidiary or branch conductors are also insulated throughout, being covered with suitable insulating material, and have exposed ends or contact-points for making contact with the strips 17, and are provided with switches, as will be hereinafter described, for electrically connecting said branch conductors to the main conductor 13 when the branches are elevated at their ends.

The outer ends of the branch conductors 19 are supported by the hinged members or arms 35, over which the conductors are lead. The end of each support 35 carries a contact-plate 31, suitably insulated therefrom and in electrical connection with the branch conductor. This contact-plate serves as the exposed end of the branch conductor for making contact with the strips 17 on the car. Each conductor-support is mounted on a rotative switch-shaft 25, which is journaled suitably in the switch-box 26. In order to make this switch-box water-tight, the shaft 25, where it pierces the sides of the box, may be provided with elastic or soft-rubber bearings, as 36, Fig. 7, into which project the stretching-pins 37, fixed upon the shaft. As the shaft rocks through about thirty degrees, these pins will stretch the rubber so that it will hug the shaft and make a water-tight joint.

My improved pick-up plow or lifter 20 for bringing the branch conductors into play consists in a slightly curved and inclined tongue or arm, preferably made of wood and armed at the end with a wear-plate 34, made of metal or any suitable material which will withstand the wear. The plow is flexible, so that it can be bent laterally on itself, and is detachably hinged at 21 to the end of the plow-beam 18 and projects downwardly into the slotted rail or conduit 16, through which the free end of the plow travels as the car moves along. This plow or lifter is provided on each side thereof with a guide flange or strip 22, over which the branch conductors slide and by which they are guided onto the contact-strips 11. Since these guide-flanges are subjected to constant wear by the branch conductors sliding thereover, they should be made of some tough and durable material. The beam 18 and plow 20, being made of wood or any suitable non-conducting material, insulate the contact-strips 17 and the guide-flanges 22 on each side thereof from each other. These strips and flanges may be insulated from each other in any other preferred way.

The car shown has two oppositely-projecting lifting-plows 20, one at each end thereof, so that the car may be run in either direction. However, since the forward plow is the active one, and it may be undesirable to have an idle plow trailing through the slot of the guide-rail, the forward plow only may be used and the same detached and applied to the reverse end of the car when it is desired to run in an opposite direction. The projecting horizontal flanges of the contact-strips 17 are bowed out at the center of their lengths, so that they are much broader there than at their ends, as clearly shown in the plan view thereof in Fig. 1. This construction is necessitated by the curves in the track, which cause the contact-strip to assume such a position relative to the vertical plane of the guide-slot when the car is rounding a curve as would allow the branch conductors to drop off the flanges if this precaution were not observed.

The branch conductors 19 intermediate their ends contain a circuit-completing device or switch, consisting, essentially, of two contacts 23 and 24, which are normally held apart, but are brought into contact by the rotative movement of one of them when the branch conductor and its support are elevated. A somewhat extended section of the outer free end of each branch conductor is made movable in order to allow the contact end thereof to be raised a suitable height above the road-bed to reach the contact-strips on the car. These end sections and the supports 35 therefor are provided with a suitable housing or casing 27, made preferably of iron, which may be cast with the switch-box 26 or made separate therefrom. This casing is placed transversely in the road-bed flush with the level of the way and is supported between the rail-stringer and the guide-rail, though any other suitable means of sustaining the casing and box may be adopted. These casings are secured to the guide-rail by the angle-irons 28, and are open only at the top to permit the hinged conductor-supports 35 to be raised and lowered, and such openings are covered by the broadened flanged back of the supports. The extreme ends of the conductor-supports 35 take into the transverse notches 29 29, which are cut in the conduit or guide-rail, so as to lie flush with the same, and these ends project across the slot of the conduit in order to permit the pick-up plow or lifter to run under them and pick them up. It will be possible to dispense with the use of a guide-rail or slot for the conductor lifter or plow. In such a case the ends of the branch conductors should be normally elevated slightly above the road-bed, so that the depending plow could run under them.

In the switch shown in Figs. 3, 4, and 5 the contact 23 is a dependent freely-swung arm mounted on and insulated from the switch-shaft 25, this insulation being clearly shown in Figs. 3 and 4. From the contact 23 leads the portion of the branch conductor 19 which runs over the support 35 to the contact-plate 31 thereon. The other portion of the branch conductor 19, which connects directly with the main conductor 13, is in communication with the contact 24, which is carried by the bracket 30, mounted rigidly on the switch-shaft 25 and from which it is insulated. When the conductor-support 35 is raised to a certain height, the contacts 23 and 24 will be rotated into contact in an obvious manner and will make the circuit over the entire branch conductor to the contact-plate.

To fully guard against the presence of water in the switch-box, I fill the box with a yielding material 32, such as soft rubber, though any other elastic insulating material that is solid will answer the purposes. This so embeds the switch-contacts that they will be well protected from any water that may find its way into the box At the same time the material so yields as to allow the contacts to be readily moved into and out of electric connnection in an obvious manner.

In Fig. 6 the contact 23 is provided with the stretching pins or spurs 33, which I design to act as stretchers for the surrounding gum to prevent the smooth surface of the contact from slipping on the same. To insure good contact between the switch-contacts, I form them each with one or more prongs and provide the contacting face of the prorgs of one of the contacts with teeth, all as shown in Fig. 6, so that as the prongs of the contact 23 are rotated toward its fellow contact the teeth will cut through the dense embedding material as it is pressed or pinched between the contacts.

The operation of the railway may be described as follows: As the car moves in the direction of the arrow (shown in Fig. 2) the forward lifter or pick-up plow 20 runs under the ends of the branch conductors 19, extending into the guide-slot in the path of the plow, which thereby elevates the same. As the car progresses, the branch conductor is raised up its full height and is placed into contact with the contact-strip 17. This completes the circuit between the main conductor and the car-motor, and each raised branch conductor serves to thus complete the circuit, so long as they are in contact with the strip 17, since elevating the branch conductors into such position effects the closing of the switch 23 24. Upon reaching the rear end of the contact-strip 17 the elevated conductor will be gradually lowered and reseated by the rear plow 20 into its normal position without jarring. The branch conductors are so placed along the road that as soon as one is about to be thrown out of connection with the contact-strip another one is raised into contact therewith, and thus the current is continually on the motor. The switches are to be so adjusted that they will be closed only when the branch conductors are raised to a certain height, in order that the exposed or contact ends of these conductors may always be maintained dead, except when connected with the contact-strip.

It will be obvious that an insulated conductor corresponding to 13 may be used as the return, in which case the branch conductors will be duplicated in order to convey the current from the other terminal of the motor to said return instead of to the wheels and rails, as at present. The space between the branch conductors may be readily lessened by increasing the length of the beam 18, which supports the contact-strips and plows.

Having thus described my improvements in electric railways, what I claim as my invention, and desire to secure by Letters Patent, is—

1. In an electric railway of the class described, an insulated main conductor provided with normally-disconnected insulated branch conductors having movable contact ends, a guide-slot midway the rails, into which said branch conductors project, and a motor-car having a flexible pick-up plow or lifter traveling in the slot, for the purpose set forth.

2. In an electric railway of the class described, an insulated main conductor provided with normally-disconnected insulated branch conductors, a guide-slot into which said branch conductors project, and a motor-car having a hinged lifter or pick-up plow, for the purpose set forth.

3. In an electric railway of the class described, an insulated main conductor provided with normally-disconnected insulated branch conductors, a guide-slot into which the branch conductors project, an electric locomotive having an insulated contact-strip and provided with a pick-up plow having a guide-flange for guiding the picked-up branches onto said strip, substantially as and for the purpose set forth.

4. In combination, an electric locomotive having a pick-up plow provided with a laterally-projecting contact-strip and an insulated main conductor having insulated branch conductors arranged along the way, a section of the free ends of the branch conductors being hinged at points to one side of the area traveled over by the contact-strip on the car, whereby the branch conductors may rest with their weight on the contact-strip when raised into connection therewith.

5. In combination, an electric locomotive provided with a pick-up plow for raising the branch conductors, a rail-stringer, a guide-slot into which the plow projects, an insulated main conductor having normally-disconnected insulated branch conductors provided with hinged outer sections, and casings for said hinged sections, such casings mounted between and supported by said rail-stringer and guide-slot rail, substantially as described.

6. An electric locomotive provided with a pick-up plow for raising branch conductors normally disconnected from an insulated main conductor into contact with circuit-completing devices on the car and having the supports 35 for said branch conductors normally housed in casings 27, located between and supported by a rail-stringer, and the slot-rail in which said pick-up plow projects.

7. In an electric railway, an insulated main conductor provided with insulated branch conductors having the contact ends thereof shiftable, and a switch in each of said branches comprising two contacts, one of which may be rotated into contact with the other by the shifting of the ends of the branch conductors, substantially as and for the purpose set forth.

8. An electric switch having relatively-movable contacts which may be moved into and out of contact with each other, combined with a yielding or elastic insulating material (such, for example, as rubber) wholly embedding the contacts and normally interposed therebetween, so that the contacts may be protected—for instance, from water—and yielding to allow the contacts to be electrically connected and disconnected, substantially as set forth.

9. An electric switch having two contacts which may be moved into and out of contact with each other, and an elastic insulating solid material (such as rubber) in which said contacts are embedded, one of said contacts having a toothed contact-surface, for the purpose set forth.

10. In an electric railway, the combination of the insulated main conductor 13, provided with the normally-disconnected insulated branch conductors 19 19, having the switch-contacts 23 24 connected to said conductors, the switch-box 26 for protecting the contacts, and the yielding insulating material 32, in which the contacts are embedded, substantially as and for the purpose set forth.

11. The combination, in an electric railway, of the plow-beam 18, carried by the car, the inclined pick-up plows 20 20, extending oppositely from each end thereof into a guide-slot disposed between the track-rails, and insulated branch conductors extending across said guide-slot along the way and having switches for connecting and disconnecting them from an insulated main conductor, whereby as the car progresses the forward pick-up or lifter 20 will gradually elevate the branch conductors into contact with circuit-completing devices on the car and the inclined rear plow will gradually reseat the said branch conductors, substantially as described.

12. A pick-up plow or lifter for raising one or more branch conductors into contact with circuit-completing devices on the car, consisting in a beam swung beneath the car and having a detachable inclined tongue depending from said beam and passing beneath said conductors for gradually raising them, whereby said inclined tongue or plow may be detached from one end of said beam and attached to the other end thereof when the car travels in an opposite direction, substantially as and for the purpose set forth.

13. The combination, in an electric railway, of a pick-up plow having fixed flanges or strips extending laterally therefrom, normally-disconnected branch conductors arranged along the way and having exposed contact ends and provided with switches for connecting and disconnecting them from an insulated main conductor, and conductor-supports 35, hinged at one side of the slot-rail, into which said plow projects and near the track-rail, whereby said hinged supports rest by gravity upon said laterally-extending flanges and are sustained thereby, thus making a firm close contact, substantially as and for the purpose set forth.

14. The combination, in an electric railway, of a pick-up plow having fixed flanges or strips extending laterally therefrom, normally-disconnected insulated branch conductors arranged at intervals along the way and having exposed contact ends and provided with switches located in water-tight boxes filled with yielding insulating material for connecting and disconnecting them from an insulated main conductor, and conductor-supports 35, hinged at one side of the slot-rail into which said plow projects and near the track-rail, whereby said hinged conductor-supports may rest by gravity upon said laterally-extending flanges and may be sustained thereby, thus making close and reliable contact, and whereby the switch-contacts are protected from moisture and short-circuiting of the current prevented, substantially as and for the purpose set forth.

15. An electric switch having contacts in a water-tight box, which contacts may be moved into and out of contact with each other, and a shaft controlling the circuit between said contacts and journaled in said box in elastic insulating material, said shaft being provided with stretching-pins projecting into said elastic material for stretching the same, as described, to form a water-tight joint, substantially as described.

In testimony whereof I have hereunto set hand, this 3d day of September, 1888, in the presence of the two subscribing witnesses.

F. MANSFIELD.

Witnesses:
CHARLES S. WILSON,
J. N. SMITH.